United States Patent
Reid et al.

(10) Patent No.: US 11,041,375 B2
(45) Date of Patent: Jun. 22, 2021

(54) METHODS AND SYSTEMS FOR ESTIMATING THE HARDNESS OF A ROCK MASS

(71) Applicant: JOY GLOBAL SURFACE MINING INC, Milwaukee, WI (US)

(72) Inventors: Anthony Reid, Whitefish Bay, WI (US); Michael J. Rikkola, New Berlin, WI (US)

(73) Assignee: Joy Global Underground Mining Inc, Milwaukee, WI (US)

( * ) Notice: Subject to any disclaimer, the term of this patent is extended or adjusted under 35 U.S.C. 154(b) by 641 days.

(21) Appl. No.: 15/642,608

(22) Filed: Jul. 6, 2017

(65) Prior Publication Data
US 2018/0010437 A1  Jan. 11, 2018

Related U.S. Application Data

(60) Provisional application No. 62/359,577, filed on Jul. 7, 2016.

(51) Int. Cl.
*E21B 44/04* (2006.01)
*E21C 39/00* (2006.01)
(Continued)

(52) U.S. Cl.
CPC .............. *E21B 44/04* (2013.01); *E21B 7/027* (2013.01); *E21B 49/003* (2013.01); *E21C 39/00* (2013.01);
(Continued)

(58) Field of Classification Search
CPC ........ E21B 44/04; E21B 7/027; E21B 49/003; E21C 39/00; G05B 13/041
(Continued)

(56) References Cited

U.S. PATENT DOCUMENTS 9,223,041 B2 * 12/2015 Wendt .................... G01V 11/00
9,378,663 B2 *  6/2016 Jensen ................... G09B 25/06
(Continued)

FOREIGN PATENT DOCUMENTS

CN         1408984 A     4/2003
CN       201184861 Y     1/2009
(Continued)

OTHER PUBLICATIONS

Khorzoughi_2013 (Use of Measurement While Drilling Techniques for Improved Rock Mass Characterization in Open-pit Mines, University of British Columbia, 2013) (Year: 2013).*
Mozaffari_2007 (MEasurement While Drilling System in Aitik Mine, Master's Thesis 2007 School of Applied Geosciences and Mining Lulea University of Technology, Lulea Sweden, Jun. 2007). (Year: 2007).*
(Continued)

*Primary Examiner* — Brian S Cook
(74) *Attorney, Agent, or Firm* — Michael Best & Friedrich LLP

(57) ABSTRACT

Systems and methods for estimating a hardness of a rock mass during operation of an industrial machine. One system includes an electronic processor configured to receive a rock mass model and to receive live drilling data from the industrial machine. The electronic processor is also configured to update the rock mass model based on the live drilling data and to estimate a drilling index for a hole based on the updated rock mass model. After estimating a drilling index for the hole, the electronic processor is also configured to set a blasting parameter for the hole based on the estimated drilling index.

14 Claims, 7 Drawing Sheets

(51) Int. Cl.
    *E21B 7/02*     (2006.01)
    *E21B 49/00*     (2006.01)
    *G05B 13/04*     (2006.01)
    *G01N 3/40*     (2006.01)
    *G01V 99/00*     (2009.01)

(52) U.S. Cl.
    CPC ............. *G05B 13/041* (2013.01); *G01N 3/40* (2013.01); *G01V 99/005* (2013.01)

(58) Field of Classification Search
    USPC .......................................................... 703/10
    See application file for complete search history.

(56) References Cited

U.S. PATENT DOCUMENTS

| | | | | |
|---|---|---|---|---|
| 9,540,928 | B2 | 1/2017 | Zhou et al. | |
| 9,637,887 | B2* | 5/2017 | Wighton | E02F 3/46 |
| 2005/0246133 | A9* | 11/2005 | Mann | E02F 3/26 |
| | | | | 702/175 |

FOREIGN PATENT DOCUMENTS

| | | |
|---|---|---|
| CN | 103344491 A | 10/2013 |
| CN | 104285123 A | 1/2015 |
| CN | 104265184 A | 7/2015 |
| CN | 105422088 A | 3/2016 |
| CN | 105891443 A | 8/2016 |
| EA | 009114 B1 | 10/2007 |
| RU | 2485313 C1 | 6/2013 |
| RU | 2014146206 A | 6/2016 |
| SU | 585286 A1 | 12/1977 |
| SU | 1618863 A1 | 1/1991 |

OTHER PUBLICATIONS

Khorzoughi_2013 (Use of Measurement While Drilling Techniques for Improved Rock Mass Characterization in Open-pit Mines, University of British Columbia, 2013) (Year: 2013).*

Chakraborty_2004 (Development of Rational Models for Tunnel Blast Prediction based on a parametric study, Geotechnical and Geological Engineering 22: 477-496, 2004). (Year: 2004).*

Brown_1972 (Experimental Blasting in the Cananea Open pit mine, University Arizona 1972). (Year: 1972).*

Yasar_2015 (Cuttability assessment using the drilling rate index (DRI) Bull Eng Geol Environ (2015) 74:1349-1361). (Year: 2015).*

Mozaffari_2007 (Measurement While Drilling System in Aitik Mine, Master's Thesis Lulea University of Technology 2007) (Year: 2007).*

Anderson_2002 (Site Investigations Strategy for Rock Mechanics Site Descriptive Model, Technical Report TR-02-01, May 2002 Swedish Nuclear Fuel and Waste Management Co.). (Year: 2002).*

Chilean Patent Office Action for Application No. 2017-01794 dated May 4, 2020 (3 pages including statement of relevance).

Office Action and Search Report issued by the Russian Patent Office for Application No. 2017123786/03 dated Nov. 2, 2020 (17 pages including English translation).

Zharikov S.N., "On the relationship between the energy intensity of drilling and blasting of rocks," Vestnik MGTU im. G. I. Nosov, 2009, N4. (6 pages including English translation of relevant portions of article).

Examination Report issued by the Mexican Patent Office for Application No. MX/a/2017/008958 dated Oct. 12, 2020 (8 pages including English translation).

Chinese Patent Office Action and Search Report for Application No. 201710546594.X dated Apr. 6, 2021 (15 pages including English summary).

\* cited by examiner

METHODS AND SYSTEMS FOR ESTIMATING THE HARDNESS OF A ROCK MASS

RELATED APPLICATIONS

The present application claims priority to U.S. Provisional Application No. 62/359,577, filed Jul. 7, 2016, the entire contents of which is hereby incorporated by reference.

BACKGROUND

Embodiments of the present invention relate to mining machines and, more particularly, relate to blasthole drill rigs and estimating the hardness of a rock mass during operation of a blasthole drill rig.

SUMMARY

In surface and underground mining operations, explosives are generally used to break a rock mass so that the rock mass may be excavated and transported within a mine for stockpiling, mineral processing, and the like. In particular, one or more blasthole drill rigs ("drills") are used to drill a pattern of holes into a rock mass for receiving explosives. The design of the blast (in example, the geometric arrangement of holes and the explosive energy delivered to each hole) defines the distribution of fragmentation of the rock mass (for example, the size of the individual rock particles). Uniform fragmentation results in consistent digging and mineral processing operations. Conversely, non-uniform fragmentation generally results in inefficiencies in digging and transportation as well as additional cost and downtime in mineral processing operations. Poor and inconsistent fragmentation may occur when a uniform blasting energy is applied to a rock mass with varying hardness and other non-homogeneous structures. Because the material properties of a rock mass are generally not uniform, the blast is ideally designed to match the explosive energy applied to each three-dimensional location of the rock mass with the energy required to achieve uniform fragmentation. By estimating the rock mass hardness across various three-dimensional locations, the blast design may be improved to match the explosive energy applied at different three-dimensional locations of the rock mass with the explosive energy required to achieve a uniform fragmentation.

Current blasting practices combine sparse geological survey data (for example, core samples) as well as heuristic data from previous nearby mining activities (for example, other blasting and drilling activities) to identify blasting requirements (for example, explosive energy requirements). The resolution of the geological survey data is limited by the cost and time required for core sampling. As a result, blasting is often planned based on the average material properties across a large mass of rock. Variations in the material lithology (for example, hardness, faulting, boundaries between material types, and the like) are not accurately known and may result in variability in the achieved fragmentation.

It is possible to use operational monitoring and other data from a drill control system to derive drilling performance metrics (for example, the specific energy of drilling). Such drilling performance metrics can be used to inform blasting activities. However, data acquired from the drill, and hence the measurement of quantities like specific energy, may be corrupted. For example, this data may be corrupted by the dynamics of the machine, the complex interaction between the machine and the rock mass, and an operational state of the machine (for example, more energy is required to drill with a worn bit than with a new bit). As such, direct measurement of the rock properties is difficult without considering the performance of the machine over time and without knowledge of the operational state of the machine (for example, replacement of a drill bit).

It should also be noted that the blast design for a hole may need to be identified within a short time of the hole being drilled to charge the hole with explosives quickly to minimize material cave-in. As such, optimizations across a full drill pattern prior to blast design are not viable as a single batch computation.

Accordingly, embodiments provide methods and systems for estimating a hardness of a rock mass during operation of an industrial machine, such as a blasthole drill rig. For example, one embodiment provides a method that includes receiving, with an electronic processor, a rock mass model and receiving live drilling data from the industrial machine. The method also includes updating the rock mass model based on the live drilling data and estimating a drilling index for a hole based on the updated rock mass model. The method also includes setting a blasting parameter for the hole based on the estimated drilling index. Optionally, the method may also include receiving live loading data, such as from at least one shovel, wheel loader, excavator, another type of mining machine, and the like (collectively referred to herein as a "secondary industrial machine") collecting the fragmented rock, and updating, with the electronic processor, the updated rock mass model based on the live loading data.

Another embodiment provides a system for estimating a hardness of a rock mass during operation of an industrial machine. The system includes an electronic processor configured to receive a rock mass model and to receive live drilling data from the industrial machine. The electronic processor is also configured to update the rock mass model based on the live drilling data and to estimate a drilling index for a hole based on the updated rock mass model. After estimating a drilling index for the hole, the electronic processor is also configured to set a blasting parameter for the hole based on the estimated drilling index.

Yet another embodiment provides a non-transitory, computer-readable medium including instructions that, when executed by an electronic processor, cause the electronic processor to execute a set of functions. The set of functions includes receiving a rock mass model and receiving live drilling data from the industrial machine. The set of functions also includes updating the rock mass model based on the live drilling data and estimating a drilling index for a hole based on the updated rock mass model. The set of functions also includes setting a blasting parameter for the hole based on the estimated drilling index.

Other aspects of the invention will become apparent by consideration of the detailed description and accompanying drawings.

DETAILED DESCRIPTION

Figure 1:
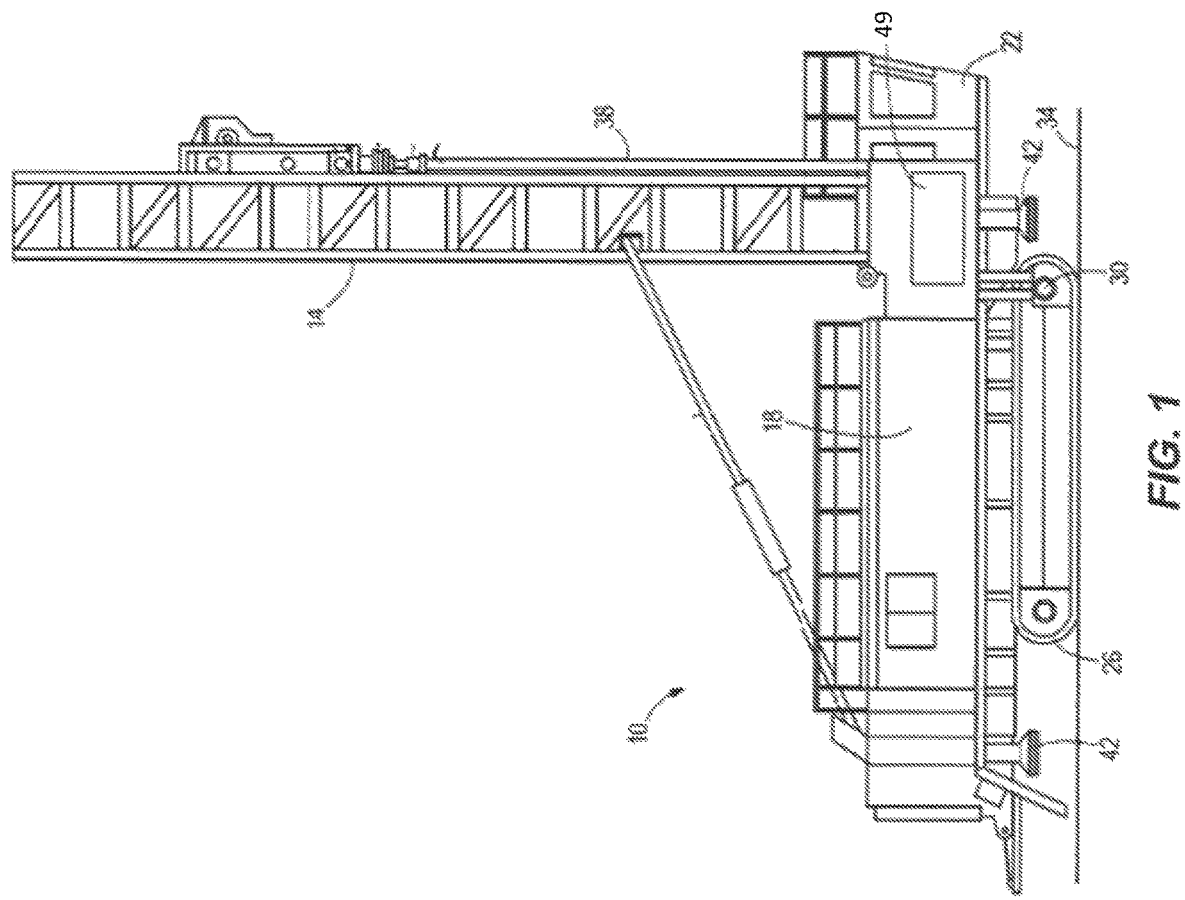
FIG. 1 is a side view of a blasthole drill rig according to one embodiment.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, and the like.

It should be noted that a plurality of hardware and software based devices, as well as a plurality of different structural components may be utilized to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. As such, it should be noted that a plurality of hardware and software based devices, as well as a plurality of different structural components may be utilized to implement the invention. For example, "controller" and "control unit" described in the specification may include one or more processors, one or more memory modules including non-transitory computer-readable medium, one or more input/output interfaces, and various connections (for example, a system bus) connecting the components. Furthermore, and as described in subsequent paragraphs, the specific configurations illustrated in the drawings are intended to exemplify embodiments of the invention and that other alternative configurations are possible.

FIG. 1 illustrates a blasthole drill rig ("drill") 10. It should be understood that the drill 10 illustrated in FIG. 1 is provided as one example of a mining machine, and the embodiments described herein may be used with any type of mining machine and are not limited to the example drill 10 illustrated in FIG. 1. Furthermore, the embodiments described herein may be used with any type of industrial machine and are not limited to a mining machine.

As illustrated in FIG. 1, the drill 10 includes a mast or drill tower 14, a base 18 (for example, a machinery house) that supports the drill tower 14, an operator's cab 22 coupled to the base 18, and crawlers 26 driven by a crawler drive 30 that moves the drill 10 along a surface 34 (for example, the ground). The drill tower 14 is coupled to and supports a drill string 38 including a plurality of components such as, for example, drill pipes, a shock sub, a thread, a drill bit, and a bit stabilizer. As illustrated in FIG. 1, the drill string 38 is configured to extend downward (for example, vertically or at an angle) through the surface 34 and into a borehole. The drill 10 also includes one or more leveling jacks 42 to support the drill 10 on the surface 34. In the extended position, a jack 42 engages with the surface 34 to support the drill 10. When the drill 10 is not in use (e.g., not drilling), the jack 42 may be moved to a fully retracted position to allow the drill 10 to move via the crawlers 26 without the jack 42 interfering with the surface 34. Furthermore, the drill 10 may include one or more drill sensors 48 (not shown in FIG. 1). The drill 10 may also include one or more controllers 49 for controlling the components of the drill 10. In some embodiments, the one or more controllers 49 communicate with the one or more drill sensors 48. Also, it should be understood that in some embodiments, the one or more controllers 49 are remote from the drill 10 and communicate with components of the drill 10 (for example, the drill sensors 48, other controllers, and the like) directly (over one or more wired or wireless connections) or through one or more intermediary devices (over one or more wired or wireless connections).

The drill sensors 48 are used to measure drilling parameters. The drilling parameters may include, for example, a depth of the drill bit, a rate of penetration, a pull-down force, a rotational speed and torque, a hydraulic pressure, an inclination of the drill tower 14, a position of the drill string 38, other drilling parameters, or a combination thereof. For example, the drill sensors 48 may include a voltage sensor, a current sensor, or a combination thereof for sensing the electrical rotary torque of the drill 10. As another example, the drill sensors 48 may include a voltage sensor, a current sensor, a pressure sensor, or a combination thereof installed on the drive of the drill 10 for sensing a pull-down force (for example, the amount of downward force applied by the drill 10 during vertical drilling). In some embodiments, the drill sensors 48 include one or more inclinometers for determining the inclination of the drill tower 14.

Figure 2:
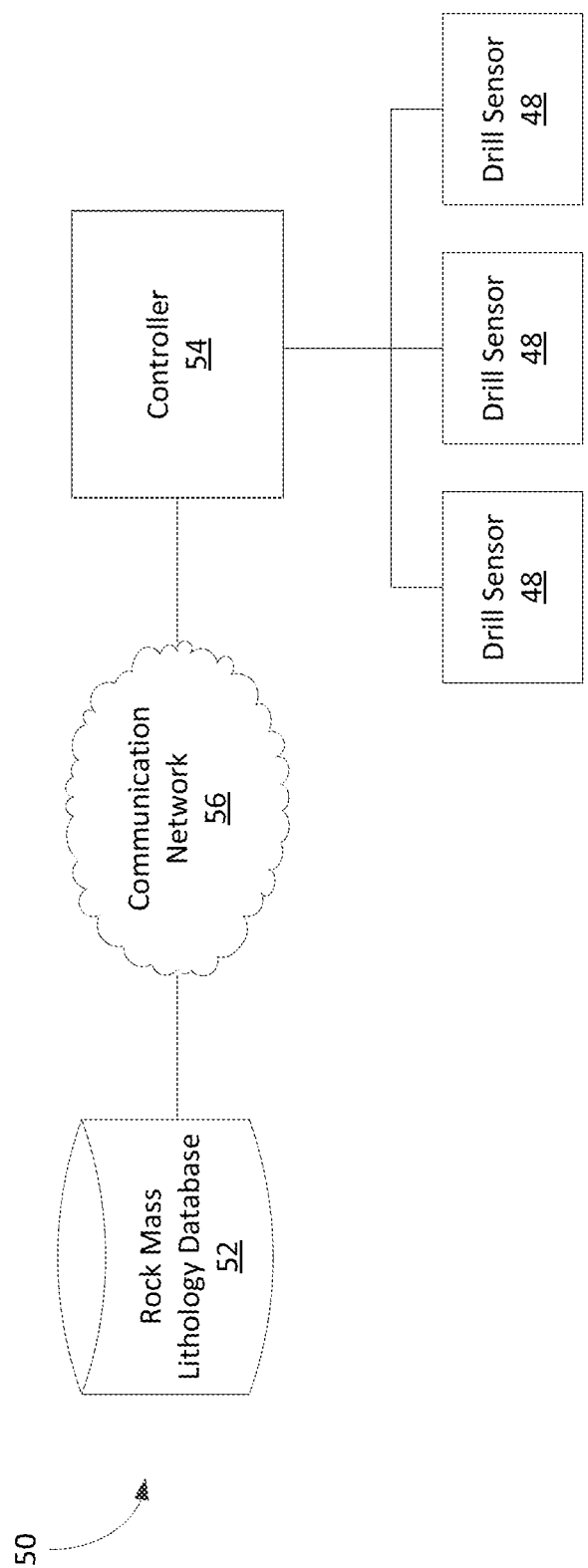
FIG. 2 schematically illustrates a system for estimating a hardness of a rock mass drilled by the blasthole drill of FIG. 1.

FIG. 2 illustrates a system 50 for estimating a hardness of a rock mass drilled using the drill 10 according to one embodiment. The system 50 includes a rock mass lithology database 52 and a controller 54. The rock mass lithology database 52 stores a rock mass model. The rock mass model represents rock mass data related to the material properties of a rock mass that may affect the drilling process. In particular, the rock mass data represented by the rock mass model may include data relating to, for example, a composition, a hardness, a location of one or more fault planes, an abrasiveness, other material properties of a rock mass that may affect drilling, or a combination thereof. In some embodiments, the rock mass model includes data representing a three-dimensional geo-spatial representation of material properties of a rock mass. In some embodiments, the rock mass model is based on previously collected rock mass data regarding a specific rock mass. For example, the rock mass model may be based on previously collected geological survey data (for example, a core sample), drilling data from previously drilled holes within the same rock mass, data relating to previously determined uncertainty of the material properties of a drilled hole, other previously collected rock mass data, or a combination thereof.

Additionally, as described in more detail below, the rock mass model may be based on (for example, updated with) rock mass data relating to previously achieved fragmentation (for example, from previous blastings), feedback data associated with machine performance (for example, indirect measurements of previous blastings collected by other machines), and the like. For example, when a rock mass is blasted, a secondary industrial machine may be used to collect the blasted rock mass material. While the secondary industrial machine interacts with the blasted rock mass material, indirect measurements (for example, live loading data) are collected by the secondary industrial machine. The indirect measurements may relate to, for example, whether the blast design was successful based on machine performance metrics relating to fragmentation of the blasted rock mass material, (for example, digging energy, digging forces, motion through the dig face, payload, and the like), whether adjustments to the blast design should be made, and the like.

In some embodiments, the rock mass lithology database 52 communicates with (for example, transmits data to and receives data from) the controller 54 over a communication network 56. The communication network 56 may include the Internet, a cellular network, a public network, a private network, or other wired or wireless network. It should be understood that in some embodiments, the communication network 56 includes a direct channel of communication between the rock mass lithology database 52 and the controller 54 (for example, a dedicated wired connection). Furthermore, in some embodiments, the rock mass lithology database 52 communicates with the controller 54 indirectly through one or more intermediary computing devices. For example, the rock mass lithology database 52 may communicate (for example, through a wired or wireless connection or network) with an intermediary computing device (for example, a desktop computer, a laptop computer, a tablet computer, a communication device, such as a smart telephone or smart wearable, and the like), and the intermediary computing device may communicate with the controller 54 (for example, through the communication network 56).

As illustrated in FIG. 2, the controller 54 is in communication with the drill sensors 48. The controller 54 and the drill sensors 48 may communicate over one or more wired or wireless connections. Although not illustrated in FIG. 2, in some embodiments, the controller 54 communicates with the drill sensors 48 through the communication network 56. Also, it should be understood that the controller 54 may communicate with the drill sensors 48 indirectly through one or more intermediary computing devices, one or more intermediary storage devices, or a combination thereof. For example, the controller 54 may communicate (for example, through a wired or wireless connection or network) with an intermediary computing device (for example, a desktop computer, laptop computer, a tablet computer, a communication device, such as a smart telephone or smart wearable, and the like), and the intermediary computing device may communicate with the drill sensors 48 (for example, through a wired or wireless connection or network). In some embodiments, the controller 54 may communicate with other equipment, such as from at least one shovel, wheel loader, excavator, another type of mining machine, and the like (collectively referred to herein as a "secondary industrial machine") to receive, for example, the feedback data, as mentioned above. Further, the controller 54 may communicate (for example, through a wired or wireless connection or network) with an intermediary storage device (for example, an intermediary database), and the intermediary storage device may communicate with the drill sensors 48 (for example, through a wired or wireless connection or network). Similarly, the controller 54 may communicate with the drill sensors 48 through the controller 49 of the drill 10.

It should be understood that, in some embodiments, the controller 54 is included in the controller 49 of the drill 10. Accordingly, the controller 54 may be located on the drill 10 or remote from the drill 10. For example, the controller 54 may be included in a remote control device or a remote control station for the drill 10.

Figure 3:
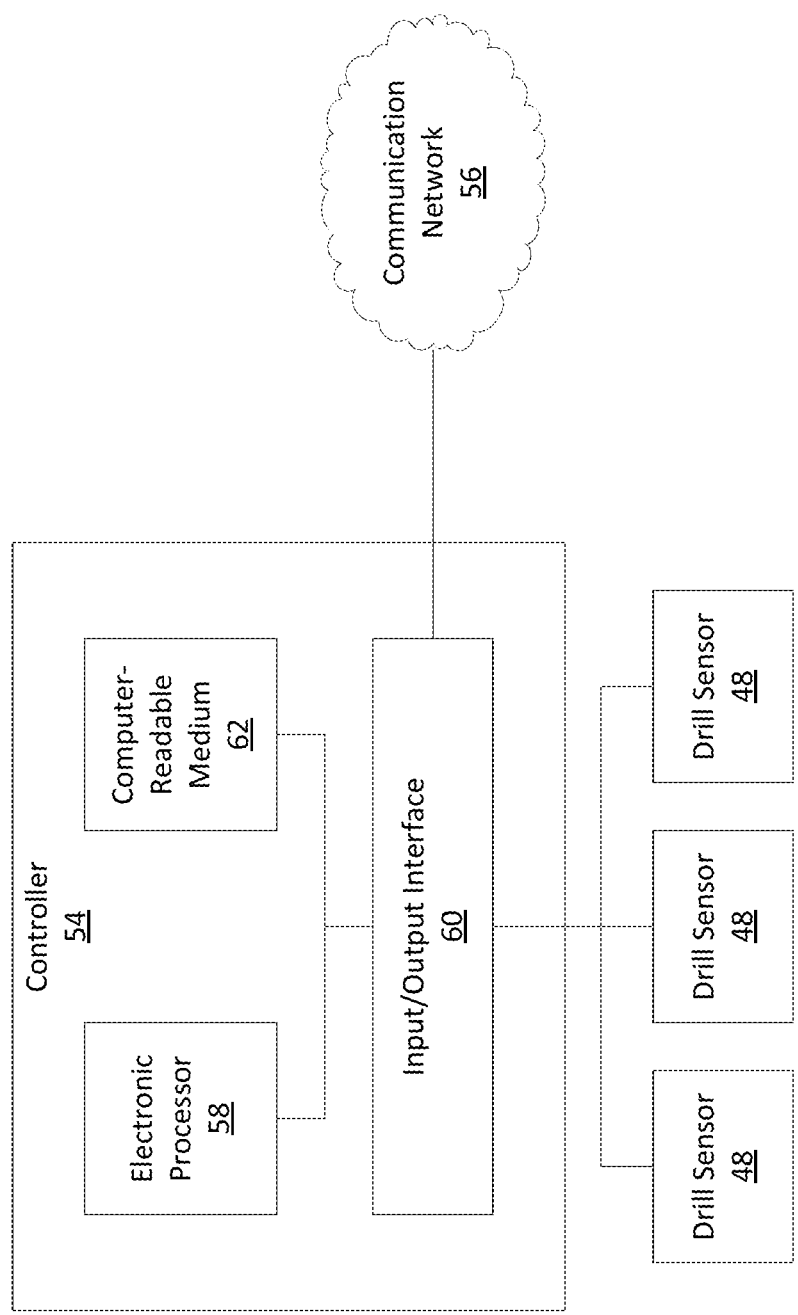
FIG. 3 schematically illustrates a controller of the system of FIG. 2.

FIG. 3 schematically illustrates the controller 54 of the system 50 according to one embodiment. As illustrated in FIG. 3, the controller 54 includes an electronic processor 58 (for example, a microprocessor, application specific integrated circuit ("ASIC"), or other programmable device), an input/output interface 60, and a computer-readable medium 62 (for example, a non-transitory computer-readable medium). The electronic processor 58, the input/output interface 60, and the computer-readable medium 62 are connected by and communicate through one or more communication lines or busses. It should be understood that the controller 54 may include fewer or additional components than as illustrated in FIG. 3 and may include components in configurations other than the configuration illustrated in FIG. 3. Also, the controller 54 may be configured to perform additional functionality than the functionality described herein. Additionally, the functionality of the controller 54 may be distributed among multiple controllers or devices.

The computer-readable medium 62 includes non-transitory memory (for example, read-only memory, random-access memory, or combinations thereof) storing program instructions and data. The electronic processor 58 is configured to retrieve instructions and data from the computer-readable medium 62 and execute, among other things, the instructions to perform the methods described herein. The input/output interface 60 transmits data from the controller 54 to external systems, networks, and devices and receives data from external systems, networks, and devices. The input/output interface 60 may also store data received from external sources to the computer-readable medium 62 or provide received data to the electronic processor 58. For example, in some embodiments, the input/output interface 60 includes a wireless transmitter that communicates with the communication network 56 to access the rock mass lithology database 52. Alternatively or in addition, the input/output interface 60 may include a connector or port for receiving a wired connection to the rock mass lithology database 52, an intermediate computing device, or an intermediate storage device as described above (for example, a universal serial bus cable). In some embodiments, the computer-readable medium 62 also stores the rock mass lithology database 52 or a portion thereof.

As illustrated in FIG. 3, the controller 54 also communicates with the drill sensors 48. It should be understood that, in some embodiments, the drill sensors 48 are included in the controller 54. As described above, when the controller 54 is located remote from the drill 10, the controller 54 may communicate with the drill sensors 48 directly or through one or more intermediary devices. Furthermore, in some embodiments, the controller 54 receives input from one or more operator control devices (for example, a joystick, a lever, a foot pedal, another actuator operated by an operator to control the operation of the drill 10, or a combination thereof). For example, an operator may use the operator control devices to operate the drill 10 to drill a hole within a rock mass. In some embodiments, the controller 54 also communicates with a user interface (for example, through the input/output interface 60), such as a display device or a touchscreen. The user interface may allow an operator to operate the drill 10 and, in some embodiments, displays feedback to an operator regarding, for example, a hardness of a rock mass, a drilling sequence, a drilling index, and the like. Additionally, as mentioned above, the controller 54 may also communicate with other equipment (for example, one or more secondary industrial machines) to, for example, receive feedback data.

Figure 4:
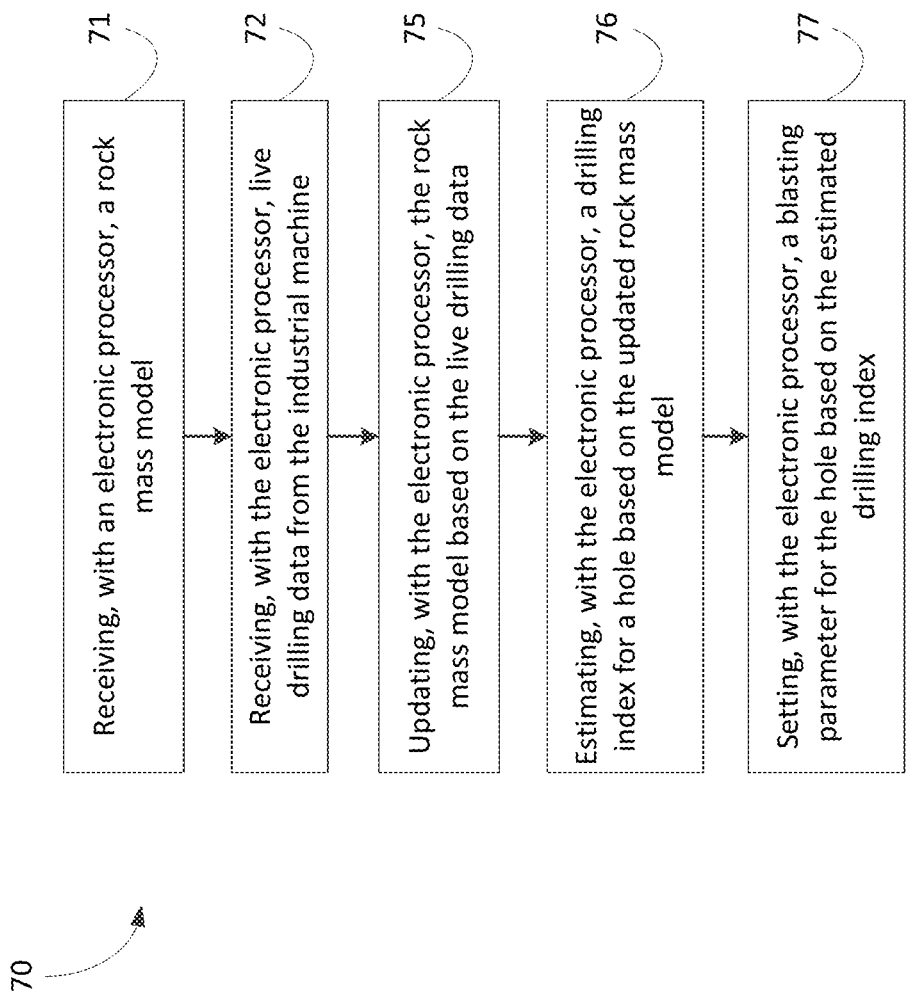
FIG. 4 is a flowchart illustrating a method of estimating a hardness of a rock mass using the system of FIG. 2.

FIG. 4 illustrates a method 70 of estimating a hardness of a rock mass performed by the controller 54 (the electronic processor 58) according to one embodiment. It should be understood that the method 70 may include more or less steps than illustrated in FIG. 4. Additionally, it should be understood that the steps illustrated in FIG. 4 may be performed in an alternative order, simultaneously, continuously, or a combination thereof.

As illustrated in FIG. 4, the method 70 includes receiving, with the electronic processor 58, a rock mass model (at block 71). In some embodiments, the controller 54 receives (via the input/output interface 60) the rock mass model from the rock mass lithology database 52 over the communication network 56. Alternatively or in addition, the rock mass model or portions thereof may be locally stored or programmed in the controller 54 (for example, the computer-readable medium 62). As described above, the rock mass model may be based on a priori data relating to the material properties of a rock mass (for example, obtained by core sampling). Additionally, as described in more detail below, the rock mass model may be updated based on feedback data received from other equipment (for example, one or more secondary industrial machines), drilling data previously-collected by the industrial machine before the live drilling data (for example, data collected by the drill 10 during the drilling of previously drilled holes), or a combination thereof.

The method 70 also includes receiving, with the electronic processor 58, live drilling data from the drill 10 (at block 72). In some embodiments, the live drilling data provides indirect measurements of the material properties of the rock mass using the drill 10 as a sensor. For example, the live drilling data may be detected using the one or more drill sensors 48. As described above, the live drilling data may include, for example, a depth of the drill bit, a rate of penetration, a pull-down force, a rotational speed and torque of the drill bit, a hydraulic pressure, a flow rate, an electrical signal, other material properties of the rock mass that may affect the drilling process, or a combination thereof. The drilling data may be referred to herein as "live drilling data" or "online measurement data." Additionally, the live drilling data may include data (determined via the Global Navigation Satellite System (GNSS)) relating to a pose of the drill 10 (for example, a three-dimensional orientation of the drill 10 and a three-dimensional position of the drill 10 in a global frame of reference).

In some embodiments, the live drilling data is filtered using one or more models associated with the drilling process. The one or more models associated with the drilling process may include, for example, a drill dynamic model, a drill-rock interaction model, a drill operational state model, a drill string model, a drill location model, a kinematic model, and the like. The drill dynamic model may capture dominate dynamics of the drill 10 and the main operating components, actuators, and the like of the drill 10. The drill-rock interaction model may capture interactions between a drill bit and a surface being drilled (for example, the surface 34 of FIG. 1). The drill operational state model may track a current operational state of the drill 10, such as whether the drill 10 is idle, repositioning, drilling, and the like, and may track holes drilled by the drill 10. In some embodiments, the operational state of the drill 10 is tracked using a finite-state machine (for example, an abstract machine encoded as an algorithm that may be in one of a finite number of states). The drill string model may track a state of the drill string 38, such as an age of a drill bit or a state of a drill bit (for example, new or used, new or dull, and the like). The drill location model may track a location of the drill 10, and the kinematic model may track a position of the drill string 38 relative to the base 18. In some embodiments, the models associated with the drilling process interact. For example, the drill dynamic model may be augmented with the state of the drill-rock interaction model in an optimal estimation framework to invert the system dynamics and estimate drilling forces and torque from indirect measurements.

In some embodiments, the models associated with the drilling process are locally stored or programmed in the controller 54 and are customized for the drill 10 and other environment factors (for example, a drilling program, a drilling schedule, a drilling method, and the like). Alternatively or in addition, the models associated with the drilling process may be stored on an external memory accessible by the controller 54 (for example, directly or indirectly through one or more intermediary devices over a wired or wireless connection).

Upon receiving the live drilling data, the electronic processor 58 updates the rock mass model based on the received live drilling data (at block 75). For example, in some embodiments, the electronic processor 58 updates the rock mass model by adding or updating data points in the rock mass model based on (determined based on) the received live drilling data. In some embodiments, the additions or updates to the rock mass model includes a rock hardness value and an uncertainty value. Also, in some embodiments, the additions or updates to the rock mass model includes the live drilling data or a portion thereof (for example, drilling forces and torque). For example, an operational state of the drill 10 may be included in a data point to link a detected rock hardness with a particular operational state of the drill 10 or components thereof (for example, a dullness of the drill bit).

The electronic processor 58 uses the updated rock mass model to estimate a drilling index (at block 76). In some embodiments, the drilling index represents an identification of one or more material properties (for example, a rock hardness) at a specific depth within a particular hole. For example, as described above, the rock mass model may include a three-dimensional geo-spatial representation of material properties of a rock mass. In some embodiments, at the commencement of drilling, the rock mass model is queried to determine a distribution of material properties for a hole to be drilled based on all information available to the rock mass model up to that point in time (for example, an a priori distribution of a drilling index). For example, the rock mass model may be queried to estimate the material properties of a specific three-dimensional location (for example, a specific depth) within a hole to be drilled. Alternatively or in addition, the rock mass model may be queried to estimate an uncertainty value associated with the estimated material properties. Thus, the distribution may be expressed in terms of material properties of the lithology of the rock mass and an uncertainty value associated with the estimated material properties (for example, with the estimated drilling index). In some embodiments, the uncertainty value is a number indicating a spread or an uncertainty in the estimated material properties (for example, a variance, a standard deviation, and the like). Alternatively or in addition, the uncertainty value may represent a level of information available in the rock mass lithology database 52 (in example, the availability and extent of prior survey data). In some embodiments, the distribution is made based on the nominal drilling depth of the drill 10. Alternatively or in addition, the distribution may be made based on a pose of the drill 10 (for example, a three-dimensional location of the drill 10 as determined by GNSS and a three-dimensional orientation of the drill 10). The prior distribution is then updated based on the live drilling data to form a posterior estimate of the material properties of the rock mass (for example, using an optimal estimation framework).

In some embodiments, the drilling index distribution for each hole is used to categorize rock mass hardness into discrete bands used for blast design. Accordingly, the method 70 may include setting, with the electronic processor 58, a blasting parameter for the hole based on the estimated drilling index (at block 77). The drilling index may be used to set a blasting parameter, such as a blasting energy, a blasting sequence, a blasting configuration and the like, for each or a plurality of holes. Additionally, in the case of a blasting energy, the drilling index may also be used to set a blasting parameter for a plurality of depths within each or a plurality of the holes. Also, in some embodiments, the drilling index and the performance of the process can be used to provide a design of a blast, a process of drilling, or a combination thereof.

Figure 5:
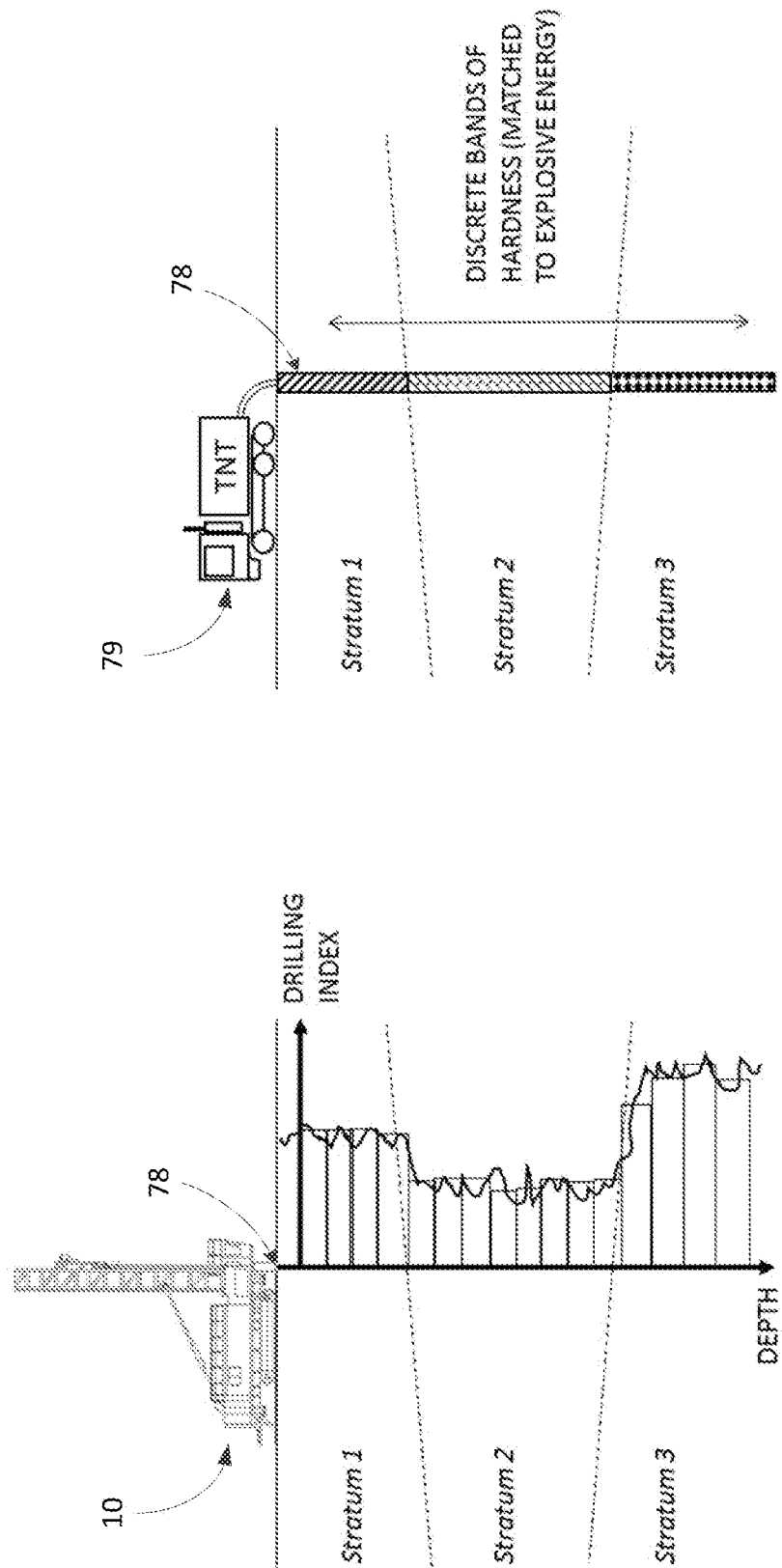
FIG. 5 graphically illustrates a blast design for a hole based on a distribution of a drilling index for the hole.

For example, FIG. 5 illustrates an example of how the drilling index distribution is converted to a discrete categorization that maps to blasting design. In particular, FIG. 5 illustrates a graphical representation of a hole 78 and associated rock hardness at various depths within the hole 78. Based on the relationship between the depth and the associated rock hardness at various depths, discrete bands of explosive energy (for example, how much explosive energy is needed at a given depth based on the associated rock hardness with that given depth) may be identified. The discrete bands may be used to provide instructions to, for example, a vehicle 79 dispensing liquid explosives. The instructions may relate to how much liquid explosive to dispense and at what depth to dispense that specific amount of liquid explosives. The instructions may be communicated electronically over a wired or wireless connection.

Figure 6:
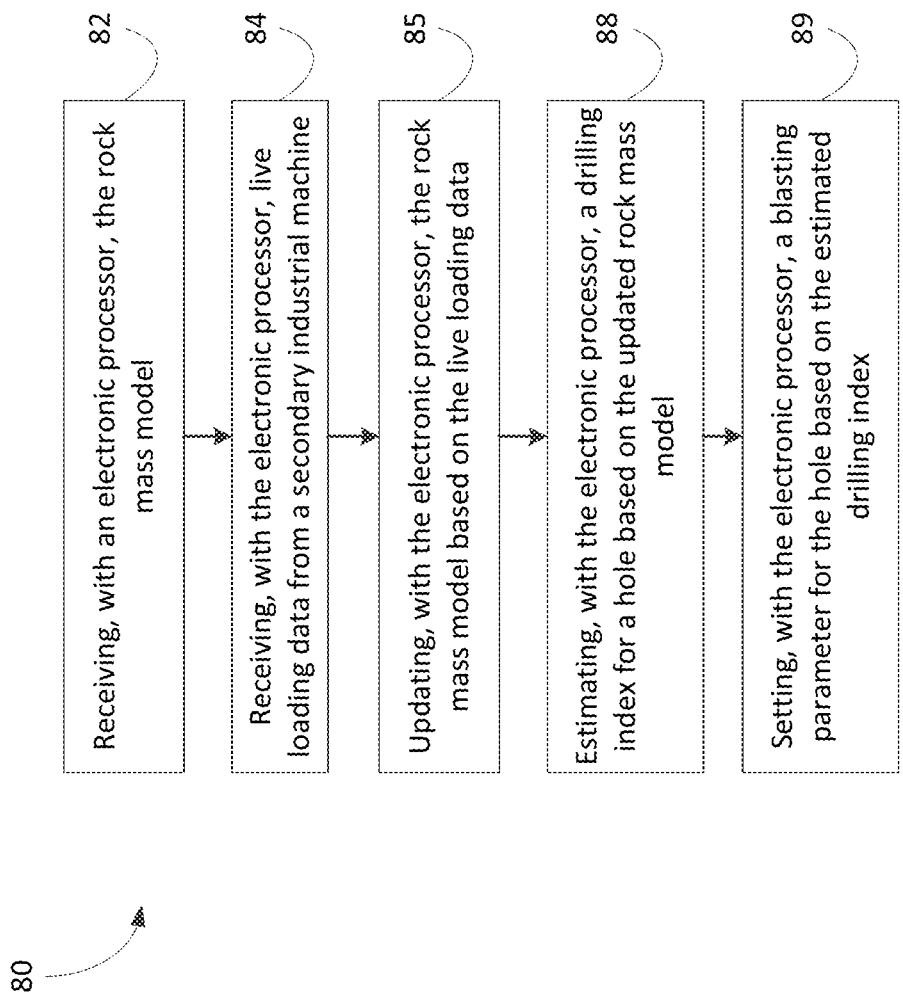
FIG. 6 is a flowchart illustrating a method of providing feedback relating to an estimated hardness of a rock mass.

FIG. 6 illustrates a method 80 of providing feedback relating to an estimated hardness of a rock mass. It should be understood that the method 80 may include more or less steps than illustrated in FIG. 6. Additionally, it should be understood that the steps illustrated in FIG. 6 may be performed in an alternative order, simultaneously, continuously, or a combination thereof. Furthermore, it should be understood that the steps illustrated in FIG. 6 may be performed in conjunction with the steps illustrated in the method 70 of FIG. 4. Also, although the method 80 is described herein as being performed by the electronic processor 58, the method 80 or portions thereof may be performed by other devices (other electronic processors).

As illustrated in FIG. 6, the method 80 includes receiving, with the electronic processor 58, the rock mass model (at block 82). As described above, with regard to the method 70, in some embodiments, the controller 54 receives (via the input/output interface 60) the rock mass model from the rock mass lithology database 52 over the communication network 56 or a local medium. In some embodiments, the rock mass model described in method 80 includes the updated rock mass model described above with respect to the method 70.

As illustrated in FIG. 6, the method 80 also includes receiving, with the electronic processor 58, live loading data (at block 84). As mentioned above, in some embodiments, live data is collected from other equipment, such as one or more secondary industrial machines (for example, other drills, shovels, wheel loaders, vehicles, and the like). For example, when a rock mass is blasted, a shovel may be used to remove/transport the blasted rock mass material. While the shovel interacts with the blasted rock mass material, the shovel (for example, one or more sensors included in the shovel) collects indirect measurements of the fragmented rock (for example, a payload amount, a digging force, a motion through the dig face, and the like). The indirect measurements may relate to, for example, a particle size of the blasted rock material, a composition of the blasted rock material, and the like.

The method 80 also includes updating, with the electronic processor 58, the rock mass model based on the received live loading data (at block 85). In some embodiments, the rock mass model is updated by adding data points to the rock mass model, updating data points included in the rock mass model, or a combination thereof based on the received live loading data. As described above with respect to method 70, the electronic processor 58 uses the updated rock mass model to estimate one or more drilling indexes (for example, an identification of rock hardness at a depth within a hole) (at block 88). In some embodiments, as described above with respect to method 70, the electronic processor 58 sets a blasting parameter for the hole based on the estimated drilling index (at block 89).

Figure 7:
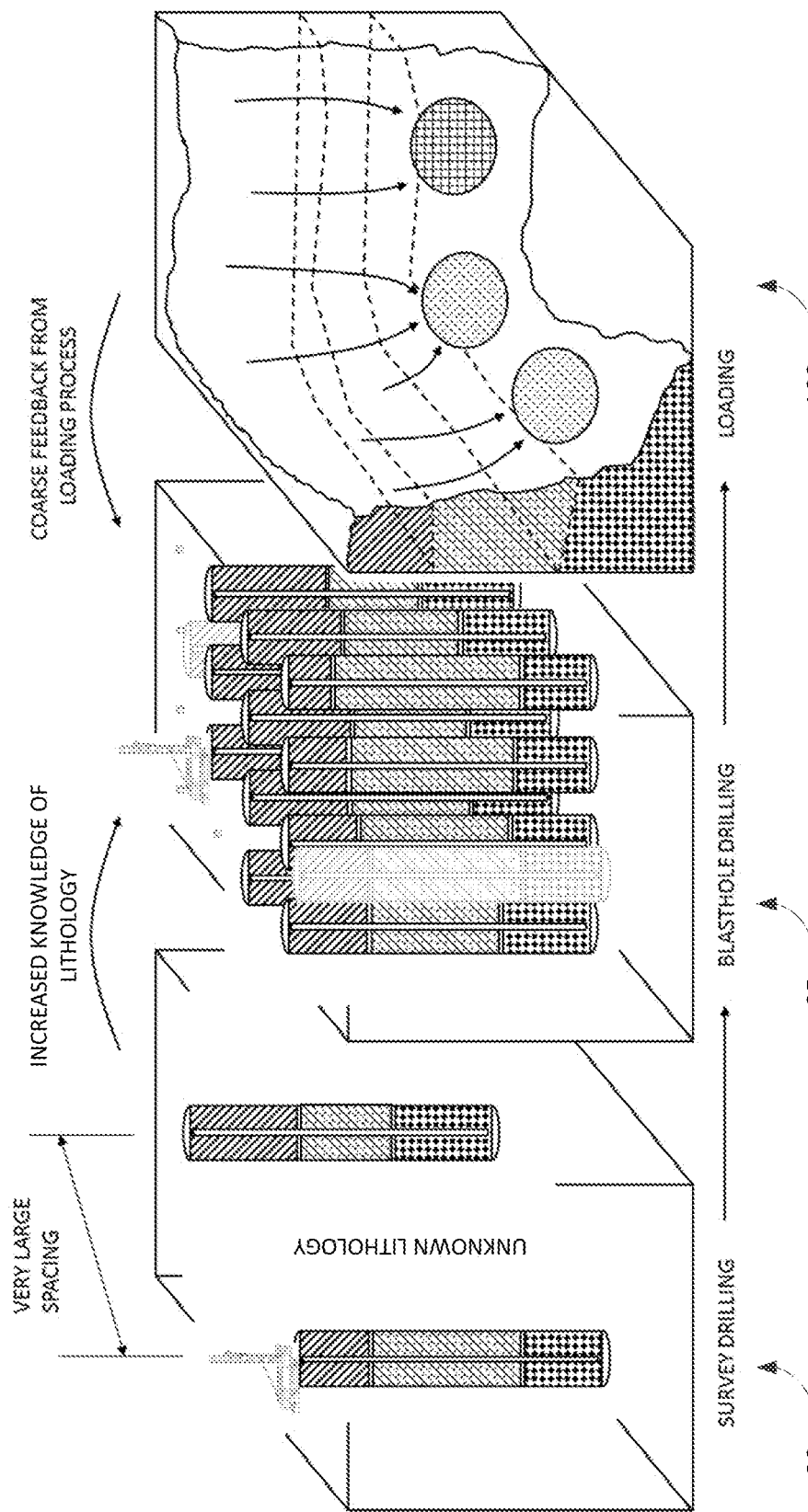
FIG. 7 schematically illustrates successive phases of survey drilling, blast hole drilling, and loading blasted material from the perspective of information available to a model of the rock mass.

Accordingly, in some embodiments, the live loading data is used as feedback data for the rock mass model. For example, the live loading data may be used to correct the rock mass model for deviations between a desired fragmentation and an achieved fragmentation. For example, FIG. 7 illustrates three exemplary phases of a drilling process. A first phase 90 illustrates a rock mass model and the associated information in the rock mass model based on geological survey data (for example, core sampling). As the drilling process progresses and additional data (in example, the live drilling data) is collected, the rock mass model is updated (for example, the knowledge of material properties of the rock mass increases and the uncertainty value associated with the estimated material properties decreases), as illustrated in a second phase 95. Additionally, in some embodiments, once blasting is performed, the live loading data is collected to further update the rock mass model (for example, to correct for deviations between a desired fragmentation and an achieved fragmentation), as illustrated in a third phase 100.

In the methods described herein, the information (for example, material properties of a rock mass) from the rock mass model is updated with the live drilling data, the live loading data, or a combination thereof. Accordingly, in some embodiments, the rock mass model is continuously updated to incrementally build knowledge and confidence in the rock mass model. In other words, both the live drilling data and the live loading data may be used as the feedback data for the rock mass model. Thus, an optimal scheme is developed by continuously updating the rock mass model. As noted above, the live drilling data may include a depth of the drill bit, a rate of penetration, a pull-down force, a rotational speed and torque, or a combination therefore. In some embodiments, the estimated drilling index also takes into account a configuration of a plan area of a face of a drill bit (for example, a design of the drill bit) as set by, for example, a manufacturer of the drill bit. Such configuration information may be received from, for example, a device (for example, a controller) associated with the drill 10. The live drilling data, the live loading data, or a combination thereof may be used to modify the distribution provided by the rock mass model to provide a distribution with a higher resolution (for example, a higher accuracy) than geological surveying may practicably provide. For example, the live drilling data, the live loading data, or a combination thereof may be used to modify the uncertainty value to also account for noise associated with the live drilling data, the live loading data, or a combination thereof.

In some embodiments, a classification scheme is used to determine a drilling index. In this embodiment, the rock mass model is used to determine a plurality of probabilities of particular lithographic features, by location, down the hole. The lithographic features are treated as sub-populations with unique characteristics in terms of the distributions of operational metrics and performance metrics logged from the drill 10 (for example, a specific energy of drilling, a rate of penetration, a pull-down force, a rotation speed and torque, and the like). The drilling index or classifier may then be framed as a missing-data problem whereby the live drilling data is used as inputs to determine the member of the rock mass being drilled within the sub-populations of lithology.

In other embodiments, the drilling index is determined using a Markov-transition model that determines when a drilling regime changes based on a likelihood of transition determined from the a priori rock mass information queried from the rock mass model and the live drilling data, the live loading data, or a combination thereof.

As described above, regardless of how the drilling index is determined, as drilling progresses, the rock mass model may also be updated with the latest estimates of material properties (in example, previously determined drilling indexes), an operational state of the drill 10, and a blasting parameter, and a subsequent operation of the controller 54 may use the updated rock mass model for future holes in the rock mass. Furthermore, as described above, the rock mass model may also be updated with data acquired from other equipment, such as a second industrial machine (for example, other drills, shovels, wheel loaders, and the like). For example, when a worksite includes two drills, three shovels, and one wheel loader, data collected by all six machines may be used to update the rock mass model. In some embodiments, the rock mass model is updated based on drilling data previously-collected by the industrial machine before the live drilling data is received.

Also, in some embodiments, the controller 54 detects significant deviations between the modeled rock properties (for example, from the rock mass model) and the measured rock properties (for example, from the live drilling data, the live loading data, or a combination thereof). The controller 54 may detect the significant deviations by comparing the modeled rock properties to the measured rock properties. The significant deviations may be flagged as potential un-modelled features (for example, rock mass properties not currently represented within the rock mass model) in the lithology of the rock mass. In some embodiments, the deviations represent distinct changes in the lithology of a rock mass that may affect blast planning (for example, a void, a fault, and the like). The rock mass model may be updated based on these flagged un-modelled features to account for the un-modelled features in subsequent operation.

Furthermore, trends in the statistics of the operational and performance data (in example, the live drilling data, the live loading data, or a combination thereof) over time may also be used to track the operational state of the drill bit (in example, wear). In other words, by tracking a performance of the drill 10 over time, the controller 54 may remove the effects of changes to machine state (for example, bit wear) and machine dynamics that may corrupt the online drilling data.

Thus, embodiments described herein provide, among other things, systems and methods for estimating the hardness of a rock mass during operation of an industrial machine. Various features and advantages of some embodiments are set forth in the following claims.

What is claimed is:

1. A system for estimating a hardness of a rock mass, the system comprising:
   an electronic processor configured to
      receive a rock mass model including parameters related to the rock mass located in a specified area,
      receive live drilling data from a first industrial machine,
      update the rock mass model during operation of the first industrial machine based on the live drilling data,
      estimate a drilling index for a hole based on the updated rock mass model,
      set a blasting parameter for the hole based on the estimated drilling index,
      receive live loading data from a second industrial machine configured to collect blasted rock mass material, the live loading data including a digging force; and
      update the rock mass model based on the live loading data from the second industrial machine.

2. The system of claim 1, wherein the rock mass model is based on a material property of the rock mass.

3. The system of claim 2, wherein the material property of the rock mass includes at least one selected from a group consisting of a composition, a hardness, a location of a fault plane, and an abrasiveness.

4. The system of claim 1, wherein the live drilling data includes at least one selected from a group consisting of a depth of a drill bit, a rate of penetration, a pull-down force, a rotational speed and torque of the drill bit, a hydraulic pressure, a flow rate, an electrical signal, and a pose of the first industrial machine.

5. The system of claim 1, wherein the drilling index includes an identification of a material property of the rock mass at a location within the rock mass.

6. The system of claim 1, wherein the rock mass model includes a three-dimensional geo-spatial representation of a material property of the rock mass.

7. The system of claim 1, wherein the electronic processor is configured to estimate the drilling index for the hole based on a design of a drill bit of the first industrial machine.

8. The system of claim 1, wherein the live loading data includes measurements collected by the secondary industrial machine during an interaction between the secondary industrial machine and a blasted rock mass material, and wherein the measurement includes a particle sized of the blasted rock material.

9. The system of claim 1, wherein the electronic processor is configured to update the rock mass model based on drilling data previously-collected by the first industrial machine before the live drilling data is received.

10. The system of claim 1, wherein the rock mass model includes a distribution of a material property for the rock mass, and wherein the distribution includes an estimated material property at a location within the rock mass and an uncertainty value associated with the estimated material property.

11. A system for estimating a hardness of a rock mass, the system comprising:
an electronic processor configured to
receive a rock mass model including parameters related to the rock mass located in a specified area,
receive live drilling data from a first industrial machine,
update the rock mass model during operation of the first industrial machine based on the live drilling data,
estimate a drilling index for a hole based on the updated rock mass model,
set a blasting parameter for the hole based on the estimated drilling index,
receive live loading data from a second industrial machine configured to collect blasted rock mass material, the live loading data including a digging energy; and
update the rock mass model based on the live loading data from the second industrial machine.

12. The system of claim 11, wherein the live loading data includes indirect measurements collected by the secondary industrial machine during an interaction between the secondary industrial machine and a blasted rock mass material, and wherein the measurement includes a particle sized of the blasted rock material.

13. A system for estimating a hardness of a rock mass, the system comprising:
an electronic processor configured to
receive a rock mass model including parameters related to the rock mass located in a specified area,
receive live drilling data from a first industrial machine,
update the rock mass model during operation of the first industrial machine based on the live drilling data,
estimate a drilling index for a hole based on the updated rock mass model,
set a blasting parameter for the hole based on the estimated drilling index,
receive live loading data from a second industrial machine configured to collect blasted rock mass material, the live loading data including a motion through a dig face; and
update the rock mass model based on the live loading data from the second industrial machine.

14. The system of claim 13, wherein the live loading data includes indirect measurements collected by the secondary industrial machine during an interaction between the secondary industrial machine and a blasted rock mass material, and wherein the measurement includes a particle sized of the blasted rock material.

* * * * *